US008085253B2

(12) United States Patent  (10) Patent No.: US 8,085,253 B2
Oveisi  (45) Date of Patent: Dec. 27, 2011

(54) LAPTOP COMPUTER, SYSTEM AND/OR METHOD FOR USING THE SAME

(76) Inventor: Nazanin Oveisi, Tehran (IR)

( * ) Notice: Subject to any disclaimer, the term of this patent is extended or adjusted under 35 U.S.C. 154(b) by 860 days.

(21) Appl. No.: 11/906,482

(22) Filed: Oct. 2, 2007

(65) Prior Publication Data

US 2008/0111798 A1    May 15, 2008

(30) Foreign Application Priority Data

Nov. 12, 2006  (IR) .................................... 82/A-7029

(51) Int. Cl.
*G06F 3/033* (2006.01)
*G06F 3/02* (2006.01)
*G09B 21/00* (2006.01)
*H04N 7/18* (2006.01)

(52) U.S. Cl. ........ 345/179; 345/168; 345/169; 434/112; 348/62

(58) Field of Classification Search .......... 345/168–179; 434/112–117; 361/679; 348/62
See application file for complete search history.

(56) References Cited

U.S. PATENT DOCUMENTS

| | | | | |
|---|---|---|---|---|
| 5,214,428 | A * | 5/1993 | Allen ............................ | 345/179 |
| 6,538,880 | B1 * | 3/2003 | Kamijo et al. ............. | 361/679.4 |
| 6,545,577 | B2 * | 4/2003 | Yap ............................... | 345/179 |
| 6,747,635 | B2 * | 6/2004 | Ossia ........................... | 345/169 |
| 7,432,912 | B2 * | 10/2008 | Cote et al. ................... | 345/169 |
| 2004/0076133 | A1 * | 4/2004 | Rinkevich et al. ............. | 370/338 |
| 2004/0090427 | A1 * | 5/2004 | Blair et al. ................... | 345/173 |
| 2004/0233176 | A1 * | 11/2004 | Denq et al. .................... | 345/173 |
| 2007/0013662 | A1 * | 1/2007 | Fauth ............................ | 345/168 |

OTHER PUBLICATIONS

Kurze, Martin, TDraw: A Computer-based Tactile Drawing Tool for Blind People, 1996, ACM, 131-138.*
"Refreshable Braille Display", http://www.abledata.com/abledata.cfmpageid=1932&ksectionid=19327&top=32538, accessed Dec. 18, 2007, Abledata.com, United States.
"Devices", http://www.tiresias.org/equipment/index.htm#High%20Technology%20Devices, accessed Dec. 18, 2007, Tiresias.org, United States.
"Humanware", http://www.humanware.com/en-international/home, accessed Dec. 18, 2007, Humanware.com, United States.
"PAC Mate", http://www.freedomscientific.com/fs_products/PACmate2.asp, accessed Dec. 18, 2007, Freedomscientific.com, United States.
"Hardware", http://www.freedomscientific.com/fs_products/hardware.asp, accessed Dec. 18, 2007, Freedomscientific.com, United States.
"Helpful Products for Blind and Physically Handicapped People", http://www.blindreaders.info/aids.html, accessed Dec. 18, 2007, Blindreaders.info, United States.

(Continued)

*Primary Examiner* — Bipin Shalwala
*Assistant Examiner* — Ryan A Lubit
(74) *Attorney, Agent, or Firm* — Patents & TMS, P.C.

(57) ABSTRACT

A laptop computer, a system and/or a method for using the same are provided. The laptop computer, the system and/or the method has a monitor, input boards, a base, an intelligent pen and a headset. The monitor has a screen, a magnetic pen guidance system, an on/off switch for the magnetic pen guidance system, a taskbar area, braille signs and compartments for storing the input boards. The input boards may be, for example, a braille board, a standard keyboard, and/or a geometry board. The base may have a receiving surface, permanent input keys, permanent braille keys, speakers and a holder for the intelligent pen. The speakers and/or the headset may provide the user with audio feedback.

20 Claims, 4 Drawing Sheets

OTHER PUBLICATIONS

"Assistive Technology", http://tricare.mil/cap/acc_sol/Assistive_Technology.cfm?CFID=22280225&CFTOKEN=10398818, accessed Dec. 18, 2007, Tricare.mil, United States.

"Readingpen Advanced", http://www.enablemart.com/Reading-Pen-II, accessed Dec. 18, 2007, Enablemart.com, United States.

* cited by examiner

LAPTOP COMPUTER, SYSTEM AND/OR METHOD FOR USING THE SAME

BACKGROUND OF THE INVENTION

The present invention generally relates to a laptop computer, a system and/or a method for using the same. More specifically, the present invention relates to a laptop computer, a system and/or a method that may be operated by a user who may be blind and/or who may be visually impaired. The laptop computer, the system and/or the method may achieve exclusive, functional and/or emotional requirements of the user with industrial design, ergonomics and/or semiotics. The laptop computer, the system and/or the method may have a monitor, one or more input boards, a base, an intelligent pen, one or more speakers and/or a headset. The monitor may have a screen, a magnetic pen guidance system, an on/off switch for the magnetic pen guidance system, a taskbar area, braille signs and/or one or more compartments for storing one or more of the input boards. One or more of the input boards may be, for example, a braille board, a standard keyboard, and/or a geometry board. The base may be electrically and/or mechanically connected to the monitor and may have one or more permanent input keys and/or a storage compartment for the intelligent pen. The base may have a receiving surface that may be a platform for securing and/or for holding one of the input boards. The receiving surface may recognize and/or may distinguish which input board may be installed thereon. One or more of the speakers and/or the headset may provide the user with audio feedback during interaction with the laptop computer and/or the system.

It is generally known that persons with blindness and/or visual impairments use computers to perform many of the same tasks as unimpaired persons. Because unimpaired persons are a majority of computer users, most computers, both laptop computers and desktop computers, are designed for primary interaction via visual senses of the computer users. Further, while most computers provide some interaction via tactile senses and auditory senses of the computer users, unimpaired persons using most computers experience an emotional connection with most computers through visual interaction. A blind person and/or a visually impaired person tends to experience only a practical connection with most computers because visual interaction may be limited and/or non-existent.

As a result, known computers and/or devices are provided to enable blind and/or visually impaired persons to use computers. Known computers and/or devices typically provide limited functionality. Further, known computers and/or devices may be exceedingly complex considering the limited functionality they provide to blind persons and/or to visually impaired persons. While using known computers and/or device, the blind person and/or the visually impaired person may only experience the practical connection with known computers and/or devices. Moreover, the blind person and/or the visually impaired person may use known computers and/or devices in conjunction with computers designed for unimpaired persons.

However, the blind person and/or the visually impaired person may prefer to use devices and/or computers that have been designed for unimpaired persons. For example, the blind person and/or the visually impaired person may prefer to interact with computers in a manner similar to unimpaired persons to avoid being recognized as a blind person and/or a visually impaired person. Further, the blind person and/or the visually impaired person may prefer to use devices and/or computers that fulfill their needs and/or their expectations in a computer. Moreover, the blind person and/or the visually impaired person may prefer to avoid the complexity and/or user unfriendliness of known computers and/or devices.

A need, therefore, exists for a laptop computer, a system and/or a method that may be operated by a user who may be blind and/or who may be visually impaired. Additionally, a need exists for a laptop computer, a system and/or a method that may achieve exclusive, functional and/or emotional requirements of the user with industrial design, ergonomics and/or semiotics. Still further, a need exists for a laptop computer, a system and/or a method that may provide primary interaction with a user via tactile and/or auditory senses of the user. Still further, a need exists for a laptop computer, a system and/or a method that may be easily stored and/or transported by a user who may be blind and/or visually impaired. Still further, a need exists for a laptop computer, a system and/or a method that may allow a blind and/or visually impaired user to interact in a manner similar to unimpaired persons to avoid being recognized as blind and/or visually impaired. Still further, a need exists for a laptop computer, a system and/or a method that may fulfill needs and/or expectations in a computer of a blind user and/or a visually impaired user. Still further, a need exists for a laptop computer, a system and/or a method that may allow a blind user and/or a visually impaired user to avoid the complexity and/or user unfriendliness of known computers and/or devices designed for visually impaired persons. Still further, a need exists for a laptop computer, a system and/or a method that may have a monitor, one or more input boards, a base, an intelligent pen, a headset, a magnetic pen guidance system, a taskbar area, braille signs and/or one or more compartments for storing one or more of the input boards.

SUMMARY OF THE INVENTION

The present invention generally relates to a laptop computer, a system and/or a method for using the same. More specifically, the present invention relates to a laptop computer, a system and/or a method that may be operated by a user who may be blind and/or who may be visually impaired. The laptop computer, the system and/or the method may have a monitor, one or more input boards, a base, an intelligent pen and/or a headset. The user may select and/or may install one of the input boards for use with the laptop computer. Moreover, the input boards may be interchanged for use on the base of laptop computer.

The monitor may have a screen, a magnetic pen guidance system, an on/off switch for the magnetic pen guidance system, a taskbar area, braille signs and/or one or more compartments for storing one or more of the input boards. Further, the monitor may have a storage bin for storing the headset when not in use. Further, the monitor may have guiding lines that may be used to determine an orientation of the laptop computer with respect to the user.

The base may have one or more permanent input keys and/or one or more permanent braille keys that may be used on the laptop computer. The permanent input keys and/or the permanent braille keys may be situated on the base and may be used and/or operated by the user independent of the input board selected, installed and/or used. Further, the base may have a storage compartment for the intelligent pen. The user may eject the pen from the storage compartment to use the intelligent pen. Further, the base may have a temporary holder for the intelligent pen on an external surface of the base. The temporary holder for the intelligent pen may hold the pen for quick retrieval by the user during use of the laptop computer.

One or more of speakers on the base and/or the headset may provide the user with audio feedback while the user is operating the laptop computer. The audio feedback may correspond to data entered with the input boards, the intelligent pen, the permanent braille keys and/or the permanent input keys. Moreover, the audio feedback may correspond to data input into the laptop computer and/or data retrieved from the screen with the intelligent pen.

To this end, in an embodiment of the present invention, a computer for the blind is provided. The computer has a monitor having a screen wherein the monitor has a width defined between a front surface and a back surface wherein the back surface is located in a position generally parallel to the front surface. Further, the computer has a base connected to the monitor wherein the base has a width defined between a top surface and a bottom surface wherein the bottom surface is located in a position generally parallel to the top surface. Still further, the computer has a plurality of input boards to input data into the computer wherein each of the plurality of input boards is interchangeable for use with the base wherein each of the plurality of input boards is designed for use by the blind. Still further, the computer has a plurality of compartments between the front surface of the monitor and the back surface of the monitor wherein the plurality of compartments are sized to store each of the plurality of input boards. Still further, the computer has a receiving surface on the base sized to receive one of the plurality of input boards wherein one of the plurality of input boards is used in conjunction with the receiving surface to input data into the computer. Moreover, the computer has a pen to interact with the screen and to input data with the plurality of input boards wherein the pen has a magnetic pole.

In an embodiment, the computer has a guidance means located between the front surface of the monitor and the back surface of the monitor wherein the guidance means directs the magnetic pole of the pen over the screen.

In an embodiment, the computer has a bin located between the front surface of the monitor and the back surface of the monitor wherein the bin is accessible from the back surface of the monitor.

In an embodiment, the computer has a compartment sized to hold the pen wherein the compartment is located within the base.

In an embodiment, the screen is a touch sensitive liquid crystal display.

In an embodiment, the computer has a taskbar on the screen of the monitor wherein the taskbar has a bordering member wherein the taskbar has a perimeter defined by the front surface of the monitor and the bordering member.

In an embodiment, the computer has a headset that provides two-way audible communication.

In another embodiment, a computer system for a visually impaired user is provided. The computer system has a computer having a monitor and a base wherein the monitor has a screen to display a graphical user interface of the computer wherein the monitor has a front surface and a back surface wherein the monitor has a plurality of compartments to store a plurality of input boards wherein the monitor has a plurality of guiding lines on the back surface of the monitor to determine an orientation of the computer with respect to the visually impaired user wherein the base has a receiving surface to receive one of the plurality of input boards to input data into the computer wherein the computer recognizes one of the plurality of input boards on the receiving surface. Further, the computer system has a pen to interact with the computer. Moreover, the computer system has a guidance means to direct the pen.

In an embodiment, the computer system has a button on the monitor to eject at least one of the plurality of input boards from the monitor.

In an embodiment, the computer system has a compartment inside the base to store the pen.

In an embodiment, the computer system has a holder on an external surface of the base to hold the pen.

In an embodiment, one of the plurality of input boards is a braille board to input braille characters into the computer that are displayed as standard characters by the graphical user interface of the computer.

In an embodiment, one of the plurality of input boards is a geometry board to create images displayed by the graphical user interface of the computer.

In an embodiment, one of the plurality of input boards is a standard keyboard to input standard characters into the computer that are displayed as standard characters by the graphical user interface of the computer.

In an embodiment, the computer system has a mousepad on the base wherein the mousepad displays an active software window of the graphical user interface wherein the guidance means directs the pen across the mousepad.

In another embodiment, a method for using a computer is provided. The method has the step of providing a monitor, a screen, a base, a plurality of input boards and a pen wherein the monitor has a plurality of compartments sized for storing each of the plurality of input boards wherein the screen has a taskbar area that has a perimeter defined by raised members of the monitor wherein the pen has a magnetic pole wherein the base has a mousepad to resize and display a software window displayed on the screen wherein the base has a magnetic guidance means to direct the pen wherein the base has a receiving surface to attach one of the plurality of input boards to the base. Further, the method has the step of attaching one of the plurality of input boards to the receiving surface. Moreover, the method has the step of inputting and retrieving information from the computer with any one of the pen, the screen, the taskbar area, the mousepad or one of the plurality of input boards.

In an embodiment, the method has the step of selecting the software window from the taskbar area of the screen.

In an embodiment, the method has the step of determining an orientation of the computer with a plurality of guiding lines on the monitor.

In an embodiment, the method has the step of guiding the magnetic pole of the pen across the mousepad with the magnetic guidance means to retrieve information from the computer.

In an embodiment, the method has the step of removing one of the plurality of input boards from one of the plurality of compartments.

It is, therefore, an advantage of the present invention to provide a laptop computer, a system and/or a method for using the same that may be operated by a user who may be blind and/or who may be visually impaired.

Another advantage of the present invention is to provide a laptop computer, a system and/or a method for using the same that may achieve exclusive, functional and/or emotional requirements of the user with industrial design, ergonomics and/or semiotics.

And, another advantage of the present invention is to provide a laptop computer, a system and/or a method for using the same that may have a monitor, one or more input boards, a base, an intelligent pen and/or a headset.

Yet another advantage of the present invention is to provide a laptop computer, a system and/or a method for using the same that may have a screen, a magnetic pen guidance system, an on/off switch for the magnetic pen guidance system, a taskbar area, braille signs and/or one or more compartments for storing one or more of the input boards.

A further advantage of the present invention is to provide a laptop computer, a system and/or a method for using the same that may have one or more input boards that may be, for example, a braille board, a standard keyboard, and/or a geometry board.

Moreover, an advantage of the present invention is to provide a laptop computer, a system and/or a method for using the same that may have a base that may have a receiving surface, one or more permanent input keys, one or more permanent braille keys, one or more speakers and a storage compartment for the intelligent pen.

And, another advantage of the present invention is to provide a laptop computer, a system and/or a method for using the same that may have speakers and/or a headset that may provide the user with audio feedback related to data input into the laptop computer by the user and/or displayed on the screen of the laptop computer.

Yet another advantage of the present invention is to provide a laptop computer, a system and/or a method for using the same that may provide primary interaction with a user via tactile and/or auditory senses of the user.

Another advantage of the present invention is to provide a laptop computer, a system and/or a method for using the same that may be easily stored and/or transported by a user who may be blind and/or visually impaired.

Yet another advantage of the present invention is to provide a laptop computer, a system and/or a method for using the same that may allow a blind user and/or a visually impaired user to interact in a manner similar to unimpaired persons to avoid being recognized as blind and/or visually impaired.

A still further advantage of the present invention is to provide a laptop computer, a system and/or a method for using the same that may fulfill needs and/or expectations in a computer of a blind user and/or a visually impaired user.

Moreover, an advantage of the present invention is to provide a laptop computer, a system and/or a method for using the same that may allow a blind user and/or a visually impaired user to avoid the complexity and/or user unfriendliness of known computers and/or devices designed for visually impaired persons.

And, another advantage of the present invention is to provide a laptop computer, a system and/or a method for using the same that may have one or more magnetic lines behind the screen that may be associated with a line of text being displayed on the screen.

Another advantage of the present invention is to provide a laptop computer, a system and/or a method for using the same that may have a secondary screen on the base that may have one or more magnetic lines behind the secondary screen that may be associated with a line of text being displayed on the secondary screen.

Yet another advantage of the present invention is to provide a laptop computer, a system and/or a method for using the same that may have a taskbar area that may be located on the screen and/or that may be identified and/or operated by a user through tactile interaction with the screen.

Moreover, an advantage of the present invention is to provide a laptop computer, a system and/or a method for using the same that may have a base that may have a storage compartment for an intelligent pen.

And, another advantage of the present invention is to provide a laptop computer, a system and/or a method for using the same that may have a temporary holder for the intelligent pen on an external surface of the base.

Yet another advantage of the present invention is to provide a laptop computer, a system and/or a method for using the same that may have one or more speakers and/or a headset that may provide the user with audio feedback.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention generally relates to a laptop computer, a system and/or a method for using the same. More specifically, the present invention relates to a laptop computer, a system and/or a method that may be operated by a user who may be blind and/or who may be visually impaired. The laptop computer, the system and/or the method may achieve exclusive, functional and/or emotional requirements of the user with industrial design, ergonomics and/or semiotics.

Figure 1:
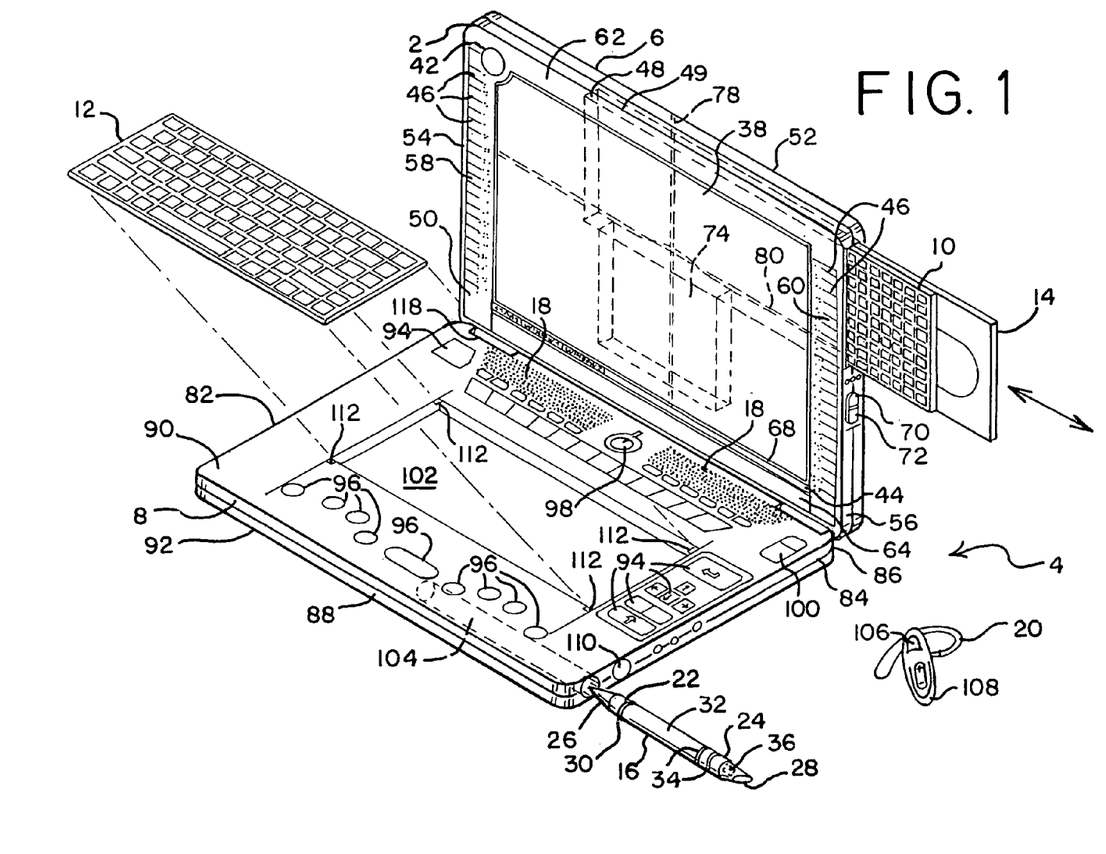
FIG. 1 illustrates a perspective view of a laptop computer in an embodiment of the present invention.

Referring now to the drawings wherein like numerals refer to like parts, FIG. 1 illustrates a laptop computer 2 in an open position and a system 4 that may have a monitor 6, one or more input boards 10, 12, 14 and a base 8. Further, the laptop computer 2 and/or the system 4 may have an intelligent pen 16, one or more speakers 18 and/or a headset 20.

FIGS. 1, 3, 5 and 6 generally illustrate the intelligent pen 16. The intelligent pen 16 may have a length defined between a first end 22 and a second end 24. The first end 22 of the intelligent pen 16 may have a first tip 26. The second end 24 of the intelligent pen 16 may have a second tip 28. In an embodiment, the second tip 28 may be wider than the first tip 26. In an embodiment, the first end 22 of the intelligent pen 16 may have one embossed cylinder 30. The embossed cylinder 30 may be located on an external surface 32 of the first end 22 of the intelligent pen 16. A user of the intelligent pen 16 may distinguish the first end 22 of the intelligent pen 16 from the second end 24 of the intelligent pen 16 by feeling the embossed cylinder 30. In an embodiment, the intelligent pen 16 may have two or more embossed cylinders 34 at the second end 24 of the intelligent pen 16. The user may distinguish the first end 22 from the second end 24 by feeling the embossed cylinders 34. The first end 22 of the intelligent pen 16 may be used for inputting data into the laptop computer 2 with one or more of the input boards 10, 12, 14 and/or with the monitor 6. The second end 24 of the intelligent pen 16 may have a magnetic pole 36. By using the second end 24 of the intelligent pen 16 in conjunction with the monitor 6, the intelligent pen 16 may be used to send audio feedback to the speakers 18 and/or the headset 20. The second end 24 of the intelligent pen 16 may allow the user to effectively read text on the monitor 6 with the audio feedback from the laptop computer 2.

The intelligent pen 16 may be a mousing device. The intelligent pen 16 may perform functions similar to known mousing devices. For example, the intelligent pen 16 may allow the user to highlight text displayed on the monitor 6. The intelligent pen 16 may allow the user to place a cursor on the monitor 6. The intelligent pen 16 may allow the user to draw on the monitor 6. The intelligent pen 16 may allow the user to select, to open and/or to close features of software of the laptop computer 2, such as, for example, software folders, software programs and/or software windows. The user may interact with the software of the laptop computer 2 by touching one or both tips 26, 28 to the monitor and/or the input boards 10, 12, 14. It should be understood that the intelligent pen 16 may be any pen and/or mousing device known to one having ordinary skill in the art. The present invention should not be deemed as limited to a specific embodiment of the intelligent pen 16.

Figure 2:
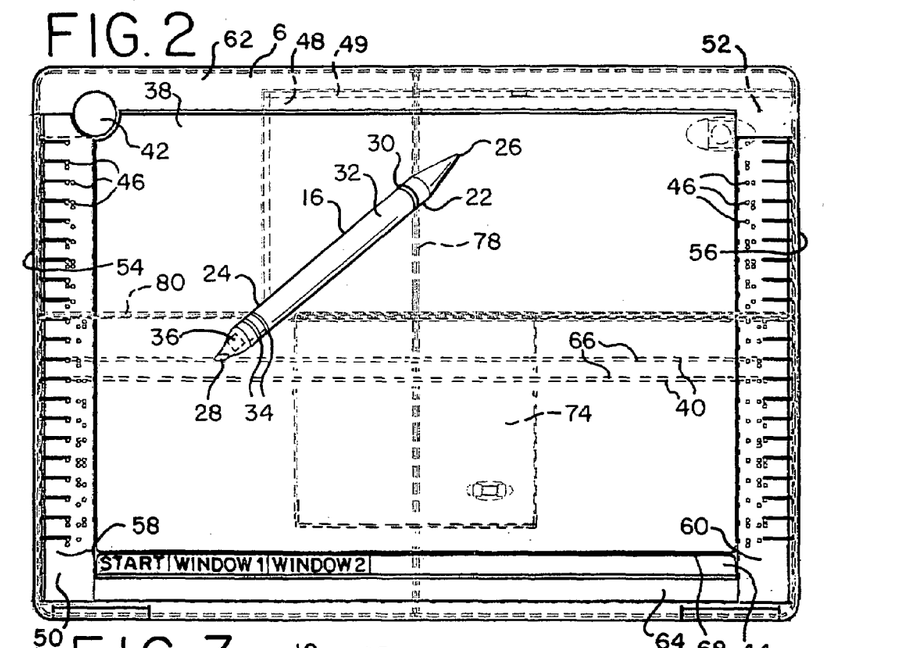
FIG. 2 illustrates a front view of a monitor of a laptop computer in an embodiment of the present invention.

FIGS. 1 and 2 generally illustrate the monitor 6. The monitor 6 may have a screen 38, a magnetic pen guidance system 40, an on/off switch 42 for the magnetic pen guidance system 40, a taskbar area 44, braille signs 46 and/or one or more compartments 48, 49 for storing one or more of the input boards 10, 12, 14.

The screen 38 may be, for example, a liquid crystal display (LCD) for displaying a graphical user interface (GUI) of the laptop computer 2. In an embodiment, the LCD may be a touch activated screen, such as, for example, a touch screen LCD and/or the like. In an embodiment, a level of brightness of the screen 38 may be adjusted by the user. In an embodiment, the user may adjust the level of brightness such that the screen 38 emits no light and is absolutely dark which may maintain a privacy of any content that may be displayed on the screen. The laptop computer 2 may provide the user with auditory feedback related to the level of brightness of the screen 38. As shown in FIG. 1, the monitor 6 may have a front surface 50 and a back surface 52 located in a position generally parallel to the front surface 50. The monitor 6 may have a width defined between the front surface 50 and the back surface 52. Further, the monitor 6 may have a first side 54 and a second side 56 located in a position generally parallel to the first side 54. The monitor 6 may have a length defined between the first side 54 and the second side 56. The first side 54 and the second side 56 may be generally planar and/or may situated in positions perpendicular to the front surface 50 and the back surface 52. The front surface 50 of the monitor 6 may have a first end 58 and a second end 60. The front surface 50 of the monitor 6 may have a top end 62 and a bottom end 64. The first end 58 of the front surface 50 of the monitor 6, the second end 60 of the front surface 50 of the monitor 6, the top end 62 of the front surface 50 of the monitor 6 and/or the bottom end 64 of the front surface 50 of the monitor 6 may border and/or may be located adjacent to the screen 38. It should be understood that the screen 38 may be any screen, display and/or graphical interface as known to one having ordinary skill in the art. The present invention should not be deemed as limited to a specific embodiment of the screen 38.

As shown in FIG. 2, the magnetic pen guidance system 40 may be one or more magnetic lines 66 that may be located in a position behind the screen 38 and/or behind the front surface 50 of the monitor 6. The magnetic lines 66 may be, for example, electromagnets that may be activated and/or deactivated with the on/off switch 42 for the magnetic pen guidance system 40. In an embodiment as shown in FIG. 2, the on/off switch 42 may be located on the front surface 50 of the monitor 6. Each of the magnetic lines 66 may be associated with a line of text displayed on the screen 38. Further, each of the magnetic lines 66 may be located adjacent to one of the braille signs 46 which may be located at the first end 58 of the front surface 50 of the monitor 6 and/or the second end 60 of the front surface 50 of the monitor 6. The braille signs 46 may be indicative of the line of text and/or of the magnetic line 66 associated with the line of text.

A user of the laptop computer 2 may use one or more of the braille signs 46 at the first end 58 of the front surface 50 of the monitor 6 and/or at the second end 60 of the front surface 50 of the monitor 6 to locate one or more of the magnetic lines 66 and/or one or more lines of text. The user may use one or more of the magnetic lines 66 to guide the second end 24 of the intelligent pen 16 across the screen 38 over one or more of the lines of text displayed on the screen 38. The laptop computer 2 may communicate with the intelligent pen 16 and/or the screen 38 to read one or more of the lines of text to the user by sending the audio feedback through the headset 20 and/or the speaker 18 during and/or after the intelligent pen 16 crosses one or more of the lines of text. It should be understood that the magnetic pen guidance system 40, the magnetic lines 66, and the on/off switch 42 may be any magnetic guidance system, magnetic lines and/or on/off switch as known to one having ordinary skill in the art. The present invention should not be deemed as limited to a specific embodiment of the magnetic pen guidance system 40, the magnetic lines 66, or the on/off switch 42.

As shown in FIG. 2, the taskbar area 44 may be located within a perimeter of the screen 38. The taskbar area 44 may formed by, for example, one or more bordering members 68 that may extend outward from the screen 38. The bordering members 38 may allow a user to distinguish the taskbar area 44 of the screen 38 from other areas of the screen 38. The user may feel one or more of the bordering members 38 of the taskbar area 44 with their fingers and thus may distinguish the taskbar area 44 of the screen 38 from other areas of the screen 38. The user may apply the intelligent pen 16 to the taskbar area 44 of the screen 38 to ascertain a location of open software windows. After determining the location of open software windows, the user may close one or more of the open software windows and/or may access the software programs and/or the features of the GUI that may be located on the screen 38 in the taskbar area 44. It should be understood that the bordering members 68 may be any member that may be affixed to and/or that may extend outward with respect to a screen as known to one having ordinary skill in the art. The present invention should not be deemed as limited to a specific embodiment of the bordering members 38.

One or more of the compartments 48, 49 may be located between the front surface 50 of the monitor 6 and the back surface 52 of the monitor 6. In an embodiment, one or more of the compartments 48, 49 may be accessible through the second side 56 of the monitor 6. One or more of the compartments 48, 49 may be sized to receive and/or to store one or more of the input boards 10, 12, 14 until the user is ready to use the input boards 10, 12, 14. In an embodiment, the user may push one or more eject buttons 70, 72 that may be located adjacent to one or more of the compartments 48, 49. When pushed, the eject buttons 70, 72 may eject one or more of the input boards 10, 12, 14 from one or more of the compartments 48, 49 of the monitor 6 for use with the base 8.

Figure 4:
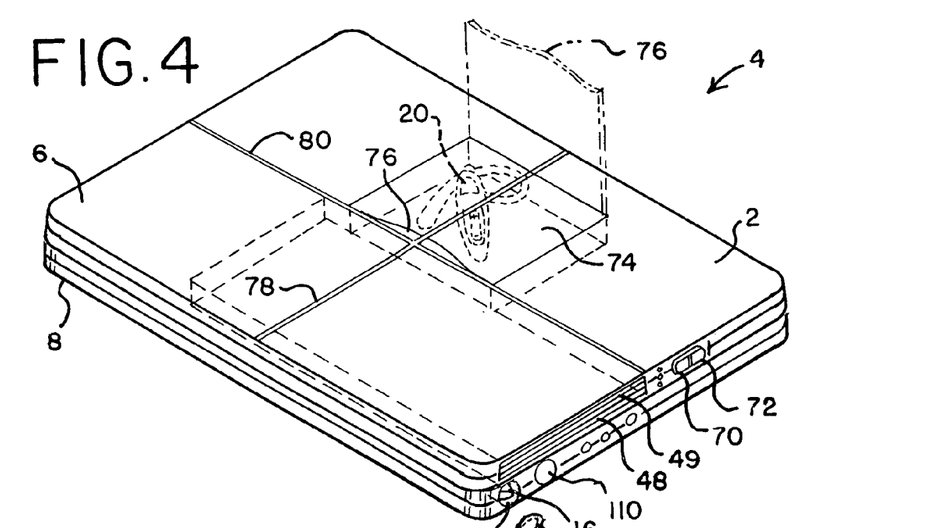
FIG. 4 illustrates a perspective view of a closed laptop computer in an embodiment of the present invention.

FIGS. 1, 2 and 4 illustrate a storage bin 74. In an embodiment, the storage bin 74 may be located between the back surface 52 of the monitor 6 and the front surface 50 of the monitor 6. The storage bin 74 may be accessible by the user through the back surface 52 of the monitor 6. In an embodiment, the storage bin 74 may have a raised lip 76 that may allow the user to locate the storage bin 74. The raised lip 76 may allow the user to open the storage bin 74 by pulling the raised lip 76 of the storage bin 74 outward with respect to the back surface 52 of the monitor 6. As shown in FIG. 4, the back surface 52 of the monitor 6 may have one or more guiding lines 78, 80 which may allow the user to locate the raised lip 76 of the storage bin 74. One or more of the guiding lines 78, 80 may be raised and/or may be embossed with respect to the back surface 52 of the monitor 6. Moreover, one or more of the guiding lines 78, 80 may allow the user to determine an orientation of the laptop computer 2 with respect to the user. The storage bin 74 may be sized to receive one or more of the headsets 20 and/or additional items that may require storage. It should be understood that the storage bin 74 may be any bin as known to one having ordinary skill in the art. The present invention should not be deemed as limited to a specific embodiment of the storage bin 74.

Figure 3:
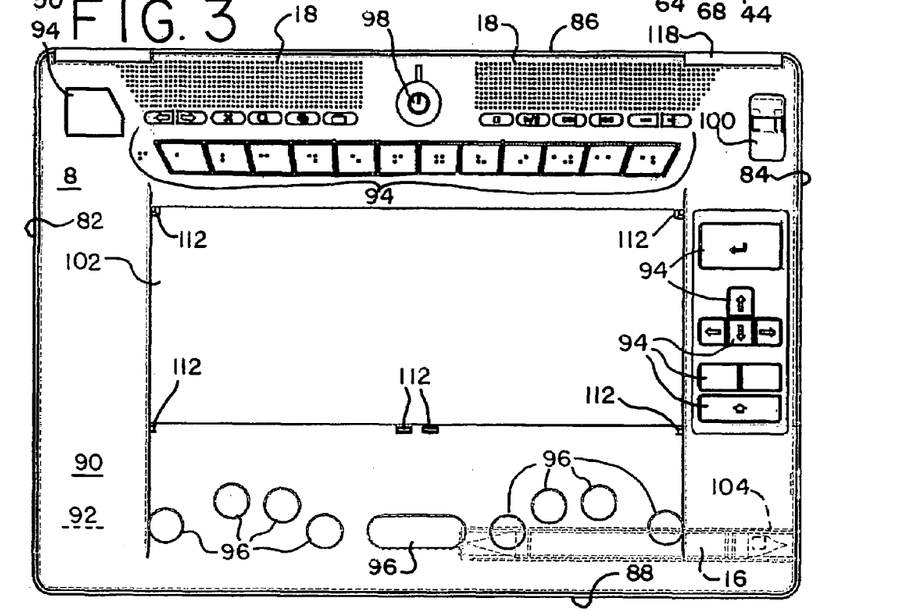
FIG. 3 illustrates a top view of a base of a laptop computer in an embodiment of the present invention.

FIGS. 1 and 3 generally illustrate the base 8. The base 8 may have a first end 82 and a second end 84 located in a position generally parallel to the first end 82. The base 8 may have a length defined between the first end 82 and the second end 84. The base 8 may have a top end 86 and a bottom end 88 located in a position generally parallel to the top end 86. The base 8 may have a height defined between the top end 86 and the bottom end 88. Further, the base 8 may have a top surface 90 and a bottom surface 92 located in a position generally parallel to the top surface 90. The base 8 may have a width defined between the top surface 90 and the bottom surface 92. In an embodiment, the top end 86 base 8 may be mechanically connected to the monitor 6 by a hinge 118.

As shown in FIG. 3, the base 8 may have one or more permanent input keys 94. Also as shown in FIG. 3, the base 8 may have one or more permanent braille keys 96. The base 8 may have a system power key 98, one or more of the speakers 18 and/or a temporary holder 100 for the intelligent pen 16. Moreover, the base 8 may have a receiving surface 102 for receiving one of the input boards 10, 12, 14 and/or a storage compartment 104 for housing the intelligent pen 16.

In an embodiment, one or more of the permanent input keys 94 may be located on the top surface 90 of the base 8 between the receiving surface 102 and the first end 82 of the base 8, the second end 84 of the base 8, the top end 86 of the base 8 and/or the bottom end 88 of the base 8. One or more of the permanent input keys 94 may be, for example, enter keys, arrow keys, function keys, volume keys, play keys, pause keys, track forward keys, track backward keys, stop keys, escape keys and/or the like. It should be understood that the permanent input keys 94 may be any keys as known to one having ordinary skill in the art. The present invention should not be deemed as limited to a specific embodiment of the permanent input keys 94.

In an embodiment, one or more of the permanent braille keys 96 may be located on the top surface 90 of the base 8 between the receiving surface 102 and the bottom end 88 of the base 8. One or more of the permanent braille keys 96 may be used to input braille characters into the laptop computer 2. One or more of the permanent braille keys 96 may be, for example, braille dot keys, backspace keys, spacebar keys, enter keys and/or the like. It should be understood that the permanent braille keys 96 may be any keys for inputting braille characters as known to one having ordinary skill in the art. The present invention should not be deemed as limited to a specific embodiment of the permanent braille keys 96.

In an embodiment, the system power key 98 may be located on the top surface 90 of the base 8 between the receiving surface 102 and the top end 86 of the base 8. The system power key 98 may be used to turn the laptop computer 2 on and/or off. It should be understood that the system power key 98 may be any key for powering the laptop computer 2 as known to one having ordinary skill in the art. The present invention should not be deemed as limited to a specific embodiment of the system power key 98.

In an embodiment, one or more of the speakers 18 may be located on the top surface 90 of the base 8. One or more of the speakers 18 and/or the headset 20 may provide the user with the audio feedback while the user is operating the laptop computer 2. The audio feedback may correspond to data entered with the input boards 10, 12, 14, the intelligent pen 16, the permanent braille keys 96 and/or the permanent input keys 94. Moreover, the audio feedback may correspond to data input into the laptop computer 2 and/or data retrieved from the screen 38 with the intelligent pen 16. One or more of the speakers 18 may be, for example, cone-based speakers, ribbon-based speakers and/or the like. Moreover, the headset 20 may be, for example, a wired headset, a bluetooth wireless headset and/or the like. In an embodiment, the headset 20 may have a loudspeaker 106 and/or a microphone 108 for two-way communications with the laptop computer 2. The present invention should not be deemed as limited to a specific embodiment of the speakers 18, the headset 20, the loudspeaker 106 and/or the microphone 108. It should be understood that the speakers 18, the headset 20, the loudspeaker 106 and/or the microphone 108 may be any speaker, headset, loudspeaker and/or microphone as known to one having ordinary skill in the art. The present invention should not be deemed as limited to a specific embodiment of the speakers 18, the headset 20, the loudspeaker 106 and/or the microphone 108.

In an embodiment, the storage compartment 104 for the intelligent pen 16 may be located between the top surface 90 and the bottom surface 92 of the base 8. In an embodiment, the storage compartment 104 for the intelligent pen 16 may be accessible at the second end 84 of the base 8. The storage compartment 104 for the intelligent pen 16 may be sized to house the length and the perimeter of the intelligent pen 16. The user may desire to store the intelligent pen 16 in the storage compartment 104 during transportation of the laptop computer 2 and/or during a period of non-use of the laptop computer 2. The user may mechanically eject the intelligent pen 16 from the storage compartment 104 by depressing an eject key 110 located on the base 8. It should be understood that the storage compartment 104 for the intelligent pen 16 and/or the eject key 110 may be any compartment, housing and/or eject key, respectively, as known to one having ordinary skill in the art. The present invention should not be deemed as limited to a specific embodiment of the storage compartment 104 for the intelligent pen 16 and/or the eject key 110.

Figure 7:
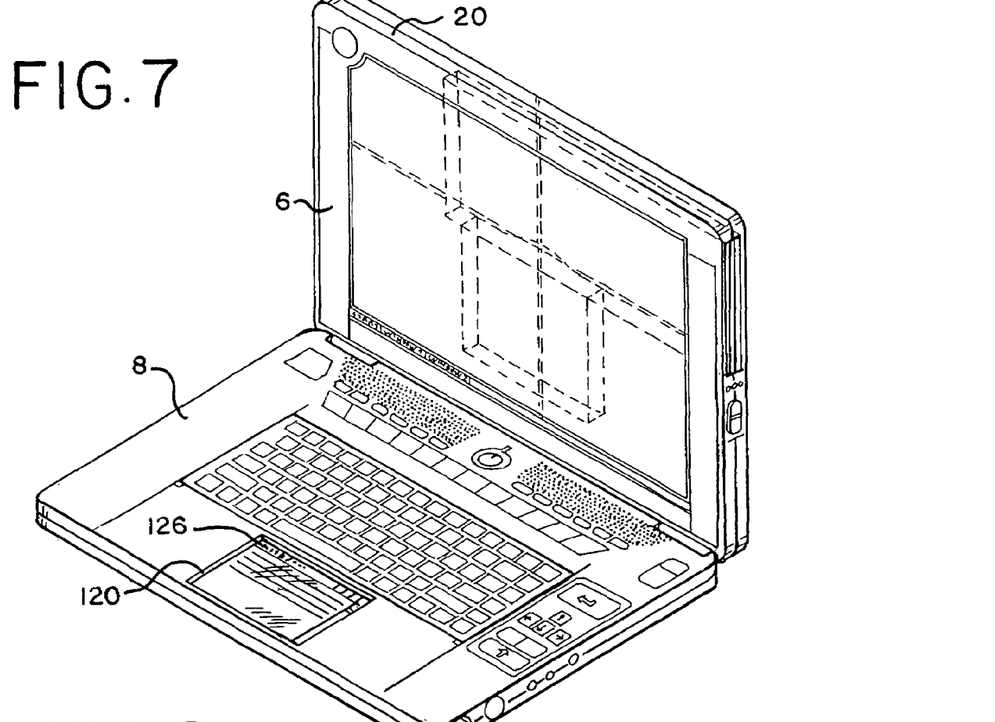
FIG. 7 illustrates a perspective view of a laptop computer in an embodiment of the present invention.
Figure 8:
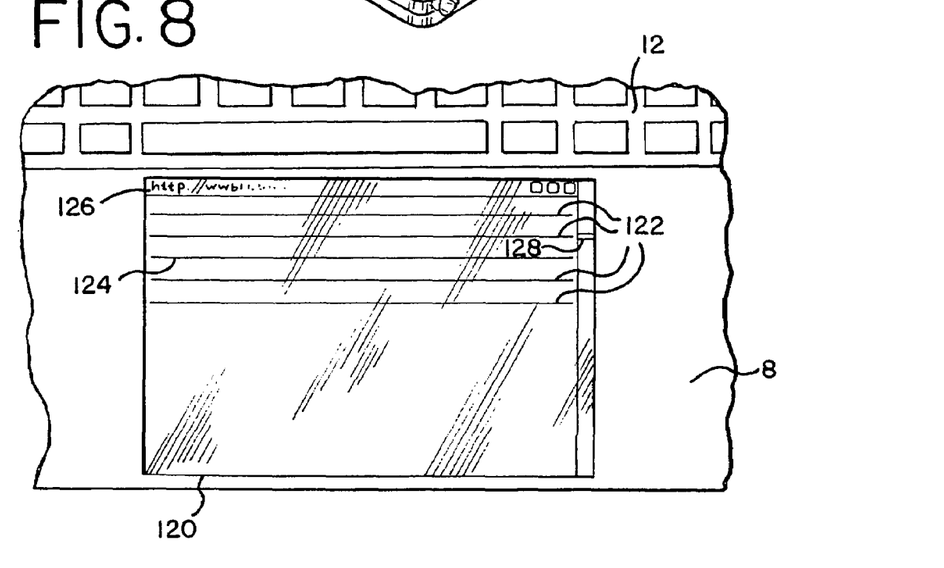
FIG. 8 illustrates a cutaway view of a base of a laptop computer in an embodiment of the present invention.

In an embodiment as shown in FIGS. 7 and 8, the base 8 may have a mousepad area 120 on the top surface 90 of the base 8. The mousepad area 120 may be, for example, an LCD screen and/or a touch-sensitive mousing surface. The mousepad area 120 may have a magnetic pen guidance system 122 that may be one or more magnetic lines 124 that may be located in a position behind the mousepad area 120 and/or behind the top surface 90 of the base 8. The magnetic lines 124 may be, for example, electromagnets that may be activated and/or deactivated by the user. In an embodiment, the user may select a software window 126 with the taskbar area 44. The laptop computer 2 may re-size the software window to fit the mousepad area 120 and/or may display the software window 126 from the mousepad area 120. Each of the magnetic lines 124 may be associated with a line of text displayed on the mousepad area 120. The user may use the magnetic pole 36 of the second end 24 of the intelligent pen 16 to guide the intelligent pen 16 over the line of text displayed on the mousepad area 120. The laptop computer 2 may detect the line of text and may communicate the line of text to the user with the speaker 18 and/or the headset 20. In an embodiment, the user may use a scroll bar 128 on the GUI associated with and/or displayed on the mousepad area 120 to navigate through the software window 126. Moreover, the user may use the intelligent pen 16 to place a cursor in the software window 126 and/or to manipulate the GUI associated with and/or displayed on the mousepad area 120. The present invention should not be deemed as limited to a specific embodiment of the mousepad area 120.

Figures 5, 6:
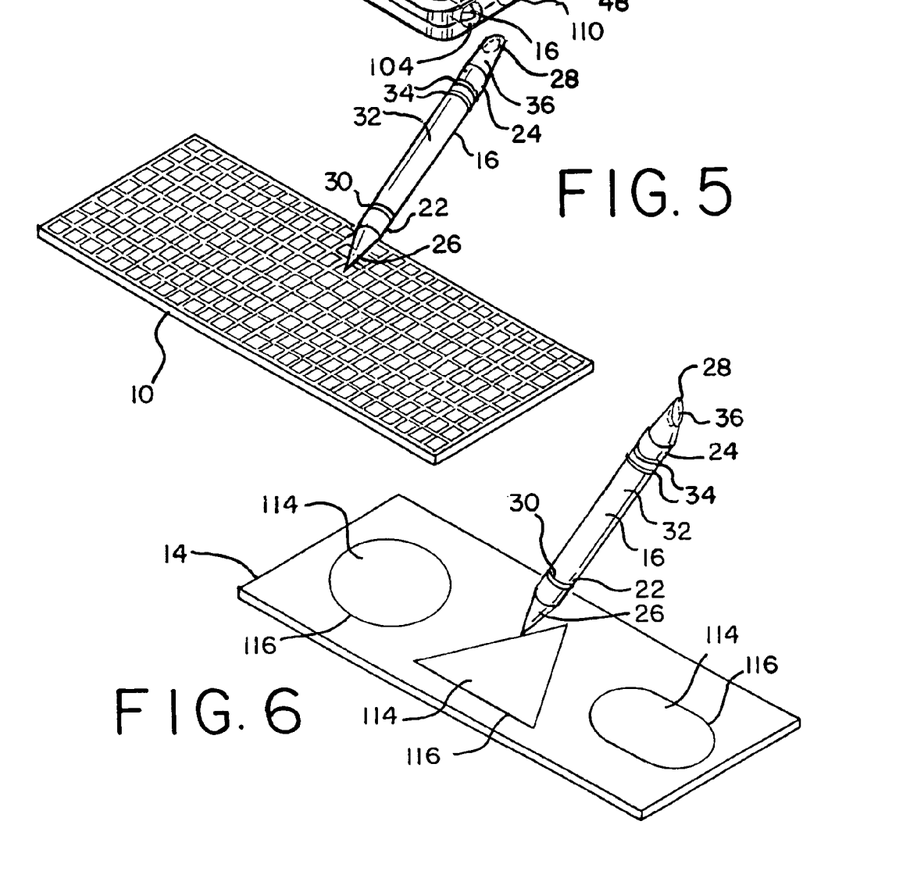
FIG. 5 illustrates a perspective view of an input board and an intelligent pen in an embodiment of the present invention.
FIG. 6 illustrates a perspective view of an input board and an intelligent pen in an embodiment of the present invention.

As shown in FIGS. 1, 5 and 6, one or more of the input boards 10, 12, 14 may be, for example, a braille board 10, a standard keyboard 12, a geometry board 14 and/or the like. The base 8 and its components may be electrically and/or mechanically connected to the monitor 6 and/or the screen 8. In an embodiment, the receiving surface 102 may be a recessed platform for receiving, for securing, for electronically connecting, for supporting, for stabilizing and/or for holding one of the input boards 10, 12, 14. In an embodiment, the receiving surface 102 may be, for example, a touch sensitive LCD display and/or a touch sensitive surface. In an embodiment, the receiving surface 102 may have one or more holes 112 for securing one of the input boards 10, 12, 14 to the receiving surface 102 and, therefore, to the base 8. The receiving surface 102 may recognize and/or may distinguish which one of the input boards 10, 12, 14 has been secured to the base 8. The receiving surface 102 and, therefore, the laptop computer 2 may recognize which one of the input boards 10, 12, 14 may be seated on the base 8 by sensing a number and/or a location of holes 112 that may be filled by the input board 10, 12, 14 that may be secured thereto. In an embodiment, the laptop computer 2 may recognize the braille board 10 as being attached to the receiving surface 102. In an embodiment, the laptop computer 2 may recognize the standard keyboard 12 as attached to the receiving surface 102. In an embodiment, the laptop computer 2 may recognize the geometry board 14 as attached to the receiving surface 102. Upon recognizing one of the input boards 10, 12, 14 attached to the receiving surface 102, the laptop computer 2 may configure itself to allow data to be input into the system 4.

In an embodiment, the user may be more accustomed to using the braille board 10 than the standard keyboard 12. The user may use the braille board 10 to input braille characters into the laptop computer 2. The user may input braille characters into the laptop computer 2 with the braille board 10 and the first tip 26 of the first end 22 of the intelligent pen 16. In an embodiment, the user may input braille characters into the laptop computer 2 by drawing braille dots on the receiving surface 102 with the first tip 26 of the first end 22 of the intelligent pen 16. In an embodiment, the user may make braille dots on the receiving surface 102 in a manner similar to making braille dots on a piece of paper with a braille punch board. The laptop computer 2 may be programmed with software for decoding braille characters into letters of an alphabet, numerals and/or other like characters. The present invention should not be deemed as limited to a specific embodiment of the braille board 10.

In an embodiment, the user may be more accustomed to using the standard keyboard 12. The standard keyboard 12 may be, for example, a keyboard having a QWERTY layout and/or other like layout for keys of the keyboard. In an embodiment, the keys of the standard keyboard 12 may have raised salient braille dots that may enable the user to find keys and/or to input data into the laptop computer 2. The user may input characters into the laptop computer 2 with the standard keyboard 12 with fingers. It should be understood that the standard keyboard 12 may be any keyboard and layout as known to one having ordinary skill in the art. The present invention should not be deemed as limited to a specific embodiment of the standard keyboard 12.

In an embodiment, the user may desire to create images with the laptop computer 2. The user may use the geometric board 14 and the intelligent pen 16 to produce geometric shapes and/or drawings with the laptop computer 2. The geometric board may have a plurality of geometric shapes embossed thereon that may allow the user to experience drawing and/or tracing of the shapes with the intelligent pen 16. The plurality of geometric shapes may be embossed lines 116 that may be depressed areas of the geometric board 116. Each of the plurality of geometric shapes may be identified by feeling the embossed lines 116 or by reading braille signs located adjacent to each of the plurality of geometric shapes. The depressed areas may be located below a top surface of the geometric board 116. The user may examine the geometric shapes by touching and/or feeling the embossed lines 116 and/or the depressed areas associated with an image 114. The present invention should not be deemed as limited to a specific embodiment of the geometric board 14 and/or the plurality of geometric shapes.

In an embodiment, the user may desire to setup and/or use the laptop computer 2. The user may use fingers to find the guiding lines 78, 80 on the back surface 52 of the monitor 6 to determine the orientation of the laptop computer 2. The user may open the storage bin 74 by locating the raised lip 76 of the storage bin 74 with the guiding lines 78, 80. The user may pull the raised lip 76 outward with respect to the back surface 52 of the monitor 6 to open the storage bin 74 and/or to expose the headset 20 that may be stored therein. The user may then attach the headset 20 to a head of the user for audible and/or verbal interaction with the laptop computer 2. Using the guiding lines 78, 80, the user may open the laptop computer 2 by lifting the first end 58 of the front surface 50 of the monitor 6 outward with respect to the top surface 90 of the base 8. The user may activate or power the laptop computer 2 by pressing the system power key 98 on the top surface 90 of the base 8.

The laptop computer 2 may proceed with a boot cycle which may enable the GUI. The user may retrieve one of the input boards 10, 12, 14 by depressing one of the eject buttons 70, 72 adjacent to one of the compartments 48, 49 that may store one of the input boards 10, 12, 14. The user may place one of the input boards 10, 12, 14 on the receiving surface 102 of the base 8. The laptop computer 2 may recognize one of the input boards 10, 12, 14 inserted thereon by determining the location and/or the number of holes 112 filled by one of the attached input boards 10, 12, 14. The user may then eject the intelligent pen 16 from the storage compartment 104 for the intelligent pen 16 inside the base 8. The user may interact with the laptop computer 2 using the intelligent pen 16, the screen 38, the taskbar area 44, the braille signs 46 on the monitor 6, the magnetic pen guidance system 40, the permanent braille keys 96, the permanent input keys 94, the input boards 10, 12, 14, the speaker 18 and/or the headset 20. The user may temporarily store the intelligent pen 16 on the temporary holder 100 while not using the intelligent pen 16.

As a result of increased tactile and/or auditory feedback provided by the laptop computer 2 and/or the system 4, an emotional relationship between the user and the laptop computer 2 and/or the system 4 may be produced. Further, the user may experience an interaction with the laptop computer 2 and/or the system 4 that may be more similar to interactions experienced by unimpaired users with computers. Moreover, the laptop computer 2 and/or the system 4 may be opened, setup, operated, shutdown, closed and/or transported by the user having little or no visible interaction with the laptop computer 2 and/or the system 4.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A computer for the blind, the computer comprising:
   a monitor having a screen wherein the monitor has a width defined between a front surface and a back surface wherein the back surface is located in a position generally parallel to the front surface wherein the monitor has a length defined between a first end and a second end wherein the second end is located in a position generally opposite to the first-end;
   a base connected to the monitor wherein the base has a width defined between a top surface and a bottom surface wherein the bottom surface is located in a position generally parallel to the top surface;
   a plurality of input boards to input data into the computer wherein each of the plurality of input boards is interchangeable for use with the base wherein each of the plurality of input boards is designed for use by the blind;
   a plurality of compartments between the front surface of the monitor and the back surface of the monitor wherein the plurality of compartments are sized to store each of the plurality of input boards;
   a receiving surface on the base sized to receive one of the plurality of input boards wherein one of the plurality of input boards is used in conjunction with the receiving surface to input data into-the computer;
   a first magnetic line that is fixed under the screen of the monitor and positioned between the front surface of the monitor and the back surface of the monitor wherein the first magnetic line extends from the first end of the monitor to the second end of the monitor wherein information is displayed from the screen of the monitor in a position overlying the first magnetic line;
   a braille sign positioned on the front surface of the monitor at the first end of the monitor wherein the braille sign is located adjacent to the screen and the first magnetic line and indicates a location of the first magnetic line;
   a pen to interact with the screen wherein the pen has a magnetic pole that is magnetically attracted to the first magnetic line wherein the first magnetic line guides the pen linearly across the screen over the information displayed from the screen of the monitor; and
   means to provide audio feedback to the blind wherein the audio feedback corresponds to the information displayed from the screen of the monitor wherein the audio feedback is provided to the blind as the pen is guided by the first magnetic line over the information displayed from the screen of the monitor.

2. The computer of claim 1 further comprising:
   a second magnetic line under the screen of the monitor positioned between the -front surface of the monitor and the back surface of the monitor wherein the second magnetic line is positioned generally parallel to the first magnetic line.

3. The computer of claim 1 further comprising:
   a bin located between the front surface of the monitor and the Back surface of the monitor wherein the bin is accessible from the back surface of the monitor.

4. The computer of claim 1 further comprising:
   a compartment sized to hold the pen wherein the compartment is located within the base.

5. The computer of claim 1 wherein the screen is a touch sensitive liquid crystal display.

6. The computer of claim 1 further comprising:
   a taskbar on the screen of the monitor wherein the taskbar has a bordering member that extends outward from the screen wherein the taskbar has a perimeter defined by the front surface of the monitor and the bordering member.

7. The computer of claim 1 wherein the means for providing audio feedback is a headset that provides two-way audible communication.

8. A computer system for a visually impaired user, the system comprising:
   a computer having a monitor and a base wherein the monitor has a screen to display a graphical user interface of the computer wherein the monitor has a front surface and a back surface wherein the back surface is positioned opposite to the front surface wherein the monitor has a length defined between a first end and a second end wherein the second end is positioned opposite to the first end wherein the monitor has a plurality of compartments to store a plurality of input boards wherein the monitor has a guiding line that extends-across the back surface of the monitor from the first end to the second end wherein the guiding line is a raised surface that indicates an orientation of the computer with respect to the visually impaired user wherein the base has a receiving surface to receive one of the plurality of input boards to input data into the computer wherein the computer recognizes one of the plurality of input boards on the receiving surface;
   a pen to interact .with the computer wherein the pen is magnetic;
   a plurality of magnetic lines fixed in a position behind the screen between the front surface of the monitor and the back surface of the monitor wherein each of the plurality of magnetic lines is positioned behind a line of text that is displayed from the screen wherein each of the magnetic lines magnetically directs the pen linearly across the line of text that is displayed from the screen; and
   means for providing audio feedback to the visually impaired user wherein the audio feedback corresponds to the- line of text that is displayed between one of the plurality of magnetic lines and the pen.

9. The computer system of claim 8 further comprising:
   a button on the monitor to eject at least one of the plurality of input boards from the monitor.

10. The computer system of claim 8 further comprising:
    a compartment inside the base to store the pen.

11. The computer system of claim 8 further comprising:
    a holder on an external surface of the base to hold the pen.

12. The computer system of claim 8 wherein one of the plurality of input boards is a braille board to input braille characters into the computer that are displayed as standard characters by the graphical user interface of the computer.

13. The computer system of claim 8 wherein one of the plurality of input boards is a geometry board to create images displayed by the graphical user interface of the computer.

14. The computer system of claim 8 wherein one of the plurality of input boards is a standard keyboard to input standard characters into the computer that are displayed as standard characters by the graphical user interface of the computer.

15. The computer system of claim 8 further comprising:
a mousepad on the base wherein the mousepad displays an active software window- of the graphical user interface wherein the mousepad magnetically directs the pen across the mousepad.

16. A method for using a computer, the method comprising the steps of:
providing a monitor, a screen, a base, a plurality of input boards, a speaker and a pen wherein the monitor has a plurality of compartments sized for storing each of the plurality of input boards wherein the screen has a taskbar area that has a perimeter defined by a member that extends outward from the screen wherein the pen has a magnetic pole wherein the base has a mousepad to resize and display a software window displayed on the screen wherein the software window displays text wherein the base has a magnetic line fixed in a position behind the mousepad to direct the magnetic pole of the pen over the mousepad and the text wherein the base has a receiving surface to attach one of the plurality of input boards to the base;
attaching one of the plurality of input boards to the receiving surface;
inputting and retrieving information from the computer with any one of the pen, the screen, the taskbar area, the mousepad or one of the plurality of input boards; and
emitting audio feedback from the speaker as the magnetic pole of the pen is directed over the mousepad and the text by the magnetic line wherein the audio feedback is indicative of the text.

17. The method of claim 16 further comprising the step of:
selecting the software window from the taskbar area of the screen.

18. The method of claim 16 further comprising the step of:
determining an orientation of the computer with a plurality of guiding lines on the monitor.

19. The method of claim 16 further comprising the step of:
guiding the magnetic pole of the pen across the mousepad with the magnetic line to retrieve information from the computer.

20. The method of claim 16 further comprising the step of:
removing one of the plurality of input boards from one of the plurality of compartments.

\* \* \* \* \*